(Model.)
W. G. RICHARDS.
SPEED INDICATOR.
No. 264,900. Patented Sept. 26, 1882.
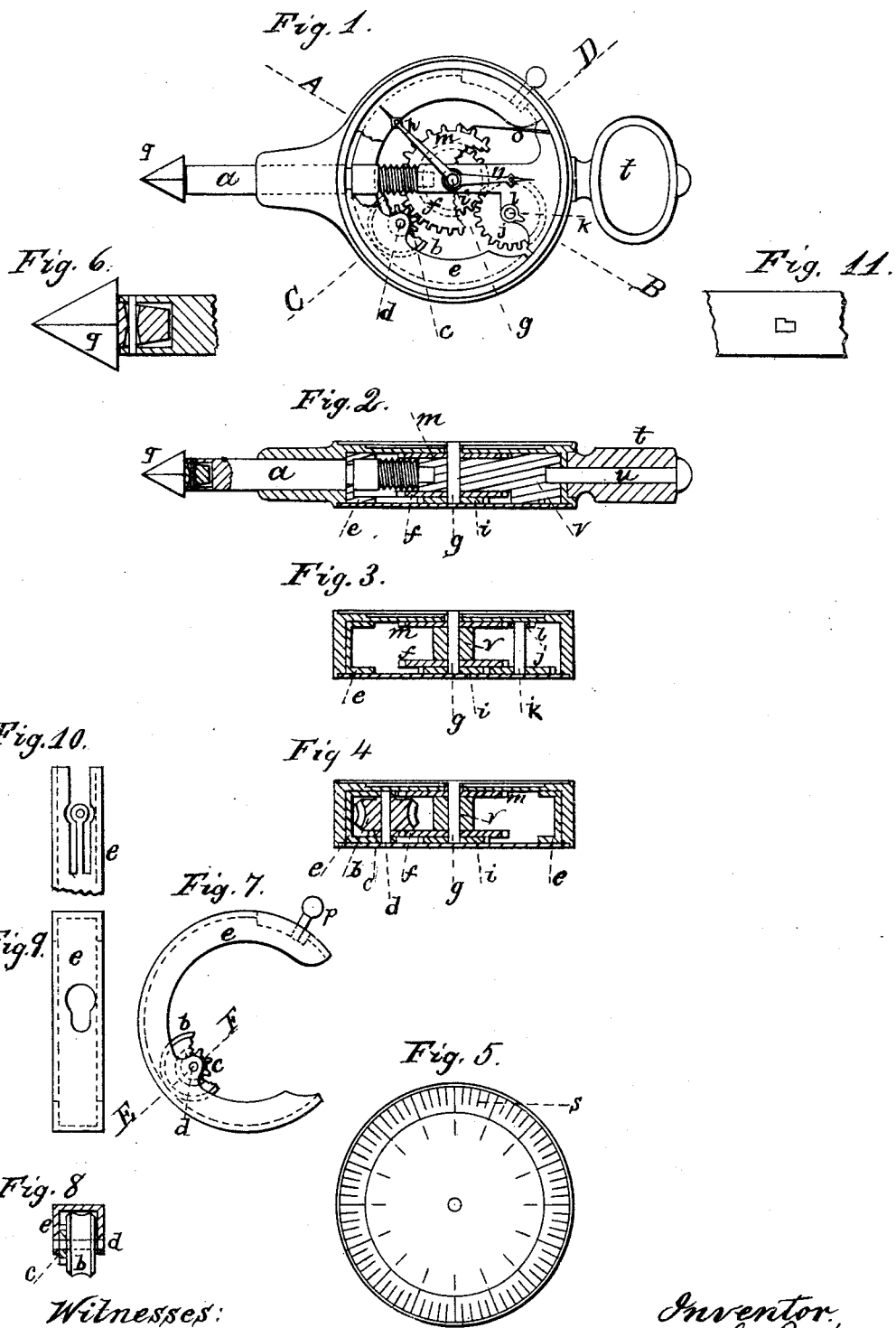
Witnesses:
C. T. Hadley
Sprague L. Scribner
Inventor.
William G. Richards.

UNITED STATES PATENT OFFICE.

WILLIAM G. RICHARDS, OF CHICOPEE, MASSACHUSETTS.

SPEED-INDICATOR.

SPECIFICATION forming part of Letters Patent No. 264,900, dated September 26, 1882.

Application filed November 8, 1880. (Model.)

*To all whom it may concern:*

Be it known that I, WILLIAM G. RICHARDS, a citizen of the United States, residing at Chicopee, in the county of Hampden and State of Massachusetts, have invented a new and useful Speed-Indicator for Revolving Shafts, of which the following is a specification.

My invention relates to improvements in instruments used to ascertain the number of revolutions per minute of shafts or machines; and the object of my invention is to provide a pocket-instrument which will accurately register the number of revolutions per minute of any revolving shaft or machine to which it may be applied, up to the number of two thousand or more, without repeating itself. I attain these objects by the mechanism illustrated in the accompanying drawings, in which—

Figure 1 is a plan, showing the instrument with face or dial removed. Fig. 2 is a vertical longitudinal section. Fig. 3 is a vertical section on line A B. Fig. 4 is a vertical section on line C D. Fig. 5 is a plan of face or dial. Fig. 6 is a section of a portion of worm-spindle $a$ on a larger scale, showing the construction of the universal joint. Fig. 7 is a plan of worm-wheel $b$ and spur-pinion $c$ supported by yoke $e$. Fig. 8 is a section of yoke $e$ on line E F. Fig. 9 is an elevation of yoke $e$, showing the opening through which the worm-spindle $a$ passes. Fig. 10 is a partial elevation of yoke $e$, showing the spring by which the yoke $e$ is held in position. Fig. 11 is an elevation of side of case of instrument, showing the manner of locking the yoke $e$ more fully.

Similar letters refer to similar parts throughout the several views.

The worm-spindle $a$ engages with worm-wheel $b$, which in this instance has thirty teeth, and also has fast upon and moving with it a spur-pinion, $c$, the two wheels revolving with or upon shaft $d$. The pinion $c$, which has in this instance nine teeth, engages with spur-wheel $f$, which in this case has thirty teeth, and carries, by means of shaft $g$, an indicator or pointer, $h$, all in such a manner that the wheel $f$ and pointer $h$ shall make one one-hundredth revolution to each single revolution of spindle $a$. The shaft $g$ also carries a spur-wheel, $i$, which engages with spur-wheel $j$ on shaft $k$. Shaft $k$ also has upon it a gear of one tooth, $l$, engaging with a spur-wheel, $m$, which in this instance has twenty teeth, and turns freely upon the shaft $g$ with an intermittent motion, and by means of a sleeve carrying a second pointer, $n$, all in such a manner that the wheel $m$ and pointer $n$ shall move one division, or a space equal to one of the teeth of the wheel $m$, in the time required for the pointer $h$ to make one complete revolution. It follows, then, that one hundred revolutions of worm-spindle $a$ will be required to produce one complete revolution of spur-wheel $f$ and pointer $h$, and that twenty revolutions of wheel $f$ and pointer $h$ will be required to produce one complete revolution of wheel $m$ and pointer $n$. Therefore one revolution of wheel $m$ and pointer $n$ equals two thousand revolutions of worm-spindle $a$. The number of teeth of wheel $m$ may be increased, thereby increasing the capacity of the instrument. The spring $o$ is so arranged as to hold spur-wheel $m$ in position until driven forward by wheel $l$.

The worm-wheel $b$, spur-pinion $c$, and shaft $d$ have bearings in yoke $e$, which can make a partial revolution about the transverse axis of the instrument in such a manner as to engage or disengage the spindle $a$ and wheel $b$, and at the same time leaving all other parts engaged, so that after the spindle $a$ is placed in contact with a revolving shaft the worm-wheel $b$ can, by means of stud $p$, be thrown into gear with the worm-spindle $a$, so that the operator need not remove his eye from the time-piece used to record the time during which it is proposed to register the number of revolutions of the shaft. After the wheel $b$ is engaged with worm-spindle $a$ it is held in its position by the stud $p$ springing into its seat, as shown by Fig. 11. The spindle $a$ is held in place by the yoke $e$ fitting into an annular groove in spindle $a$. (See Fig. 2.) The outer end of spindle $a$ is bored out to receive the taper shank of the triangular point $q$, (see Fig. 6,) the said point being held in place and prevented from turning by a pin passing through a hole drilled in spindle and shank of said point. The hole in the shank is countersunk or reamed from each side to the center, so that the point $q$ can move in any direction to a certain degree. The pin is to be smaller than the hole in the shank to facilitate the movement of the point $q$. This practically forms a universal joint, the object being to prevent the point $q$ from slipping in center of revolving shaft if the instrument is not held precisely in line with said shaft.

The face or dial (see Fig. 5) has an annular space, $s$, in this instance divided into one hundred equal parts, and numbered from 0 to 100. The face also has a second circular surface divided in this instance into twenty equal parts, or as many parts as there are teeth on wheel $m$.

The handle $t$ in this instance is of wood, but may be of other material and form of construction, and is held in place by a screw, $u$, said screw also holding the piece $v$ in place. Piece $v$ forms a bearing or stop for the worm-spindle $a$, and also supports the shafts $g$ $k$ and spring $o$.

It will be seen that the spindle $a$ radiates from or near the point where the transverse axis of instrument intersects the longitudinal axis; also, that there is but one face or dial, and that this arrangement permits of a compact and neat construction, and at the same time securing an instrument of great capacity.

I am aware that speed-indicators for revolving shafts have been heretofore constructed with a worm spindle and wheel, and with various combinations of parts; but I am not aware that any indicator for registering the number of revolutions of revolving shafts has heretofore been made as a whole similar to mine or combining the like useful features.

Having now fully described my invention, what I claim as new, and desire to secure by Letters Patent, is—

1. In a speed-indicator for revolving shafts, the yoke $e$ and stud $p$, in combination with worm-wheel $b$, said wheel being used as an intermediate wheel to transmit motion from the worm-spindle to wheel $f$ and pointer $h$, substantially as shown and described.

2. In a speed-indicator for revolving shafts, the universal joint in spindle $a$, for the purpose of guarding against loss of motion between a revolving shaft and the worm-spindle, substantially as shown and described.

3. In a speed-indicator for shafting, the worm-spindle $a$, having the socket in its outer end, in combination with the intermediate worm-wheel, $b$, spur-pinion $c$, yoke $e$, spur-wheels $f$, $i$, $j$, and $l$, the pointers $h$ and $n$, the stud $p$, and the opening in the side of the case, all substantially as and for the purpose set forth.

WM. G. RICHARDS.

Witnesses:
 C. F. HADLEY,
 S. L. SCRIBNER.